L. H. WHEELER, Dec'd,
H. W. WHEELER, Executrix, and W. H. WHEELER, Assignee of one-third interest, Assignors to the ECLIPSE WINDMILL CO.
Windmill.
No. 8,826. Reissued July 29, 1879.
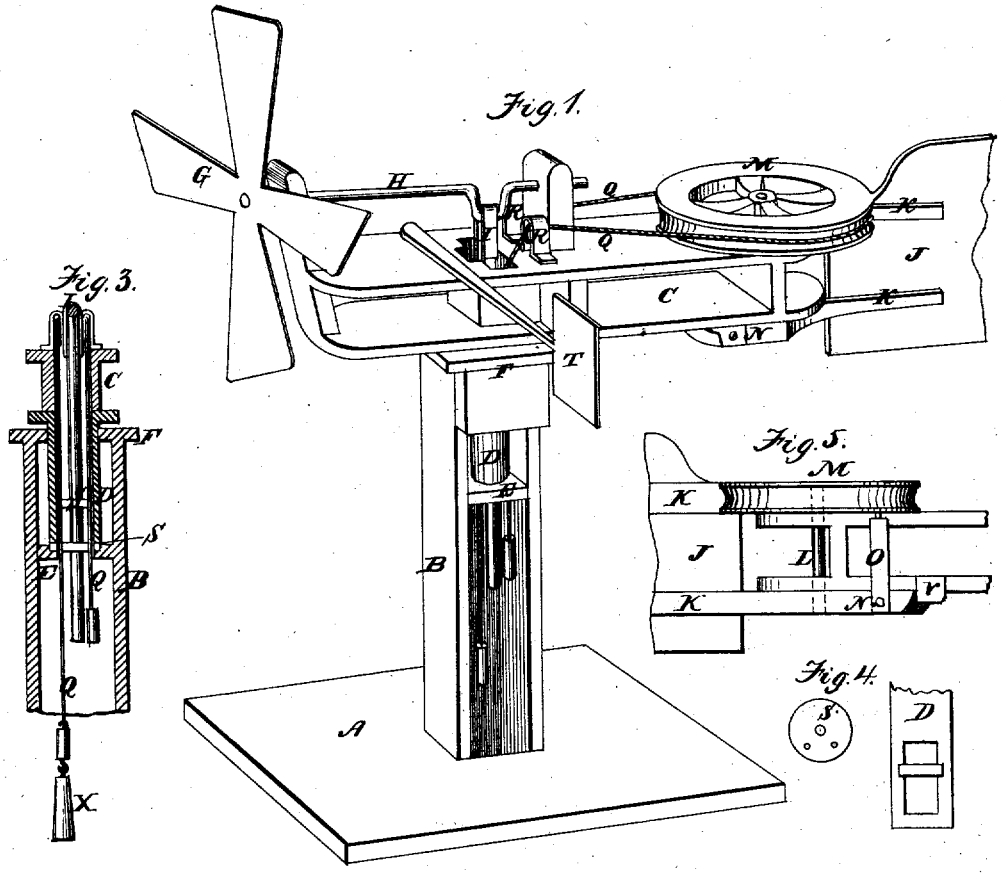
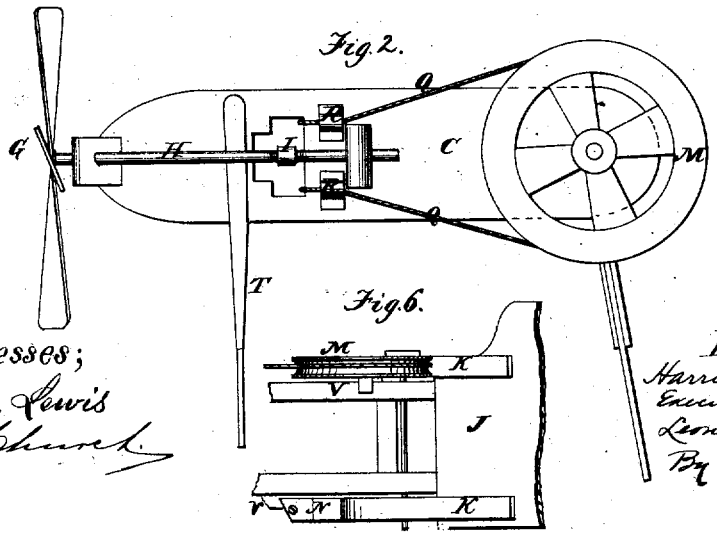
Witnesses;
Gren. Lewis
M. Shurd
Inventor
Harriet W. Wheeler
Executrix of Estate of
Leonard H. Wheeler dec
By L. Hill,
Her Att'y
N. PETERS, PHOTO-LITHOGRAPHER, WASHINGTON, D. C.

UNITED STATES PATENT OFFICE.

HARRIET W. WHEELER, EXECUTRIX, AND WILLIAM H. WHEELER, OF BELOIT, WIS., ASSIGNEE OF ONE-THIRD INTEREST OF LEONARD H. WHEELER, DECEASED, ASSIGNORS TO THE ECLIPSE WINDMILL COMPANY.

IMPROVEMENT IN WINDMILLS.

Specification forming part of Letters Patent No. 68,674, dated September 10, 1867; Reissue No. 5,531, dated August 12, 1873; Reissue No. 8,826, dated July 29, 1879; application filed March 11, 1879.

*To all whom it may concern:*

Be it known that LEONARD H. WHEELER, late of Beloit, in the county of Rock and State of Wisconsin, did invent certain new and useful Improvements in Windmills; and we do hereby declare the following to be a full, clear, and exact description of the same, reference being had to the accompanying drawings, forming part of this specification, in which—

Figure 1 is a perspective view of a windmill, showing the application of the improvements. Fig. 2 is a top-plan view of the same. Fig. 3 is a sectional view of the tower and vertical axis of the wind-wheel. Fig. 4 is a detached view of the tubular axis and guide-plate. Fig. 5 is a detached view, showing the connection of the rudder with the head of the vertical axis; and Fig. 6 is a detached view of the parts, showing the stops upon the rudder-arm and the head of the tubular axis.

Similar letters of reference in the accompanying drawings denote the same parts.

This invention has for its object to regulate and control the motion of wind-wheels, for the purpose of rendering their operation more uniform and effective than heretofore.

To this end the invention consists, first, in a wind-wheel having a single pivoted tail-vane or rudder, and a wind-wheel that swings laterally and automatically out of the wind by the direct action of the wind itself and independently of any side draft of the driven machinery; secondly, in a windmill having a single pivoted tail-vane or rudder standing normally in line with the wind, and a deflector to initiate the lateral movement of the wheel by the direct action of the wind; thirdly, in a windmill having a single large pivoted tail-vane or rudder for steering purposes, a small side vane for initiating the lateral deflection of the wheel, and a weight to normally counteract the action of the side vane; fourthly, in the arrangement of the pitman or connecting-rod for transmitting the power of the wind-wheel, together with the operating-cords of the rudder, to extend down through the vertical axis of the wind-wheel, and through one or more perforated plates contained therein, for the purpose of preventing the operating-cords from becoming twisted or tangled with each other or with the pitman as the vertical axis rotates; fifthly, in the devices for controlling the position of the wind-wheel with respect to the vane or rudder; sixthly, in an improved mode of supporting the single large tail-vane, in connection with a wind-wheel capable of automatic lateral deflection out of the wind, all as we will now proceed to describe.

In the accompanying drawings, A is the base of the machine, and B the tower, constructed in any suitable manner, to support the working parts at the proper elevation. The tower is preferably made from common plank in the form of a narrow frame or box, and receives at its top the vertical axis of the wind-wheel. This axis is composed of a tube or cylinder, D, and a suitable head or turn-table, C, and is stepped in a rabbeted plate or block, E, secured within the tower, and provided with a central opening for the passage of the operating-cords and the pitman or connecting-rod. The cap F of the tower, together with the rabbeted plate, hold the axis in a vertical position and permit it to turn freely, but with little friction.

G is the wind-wheel, of ordinary or suitable construction, mounted upon a horizontal crank-shaft, H, having its bearings in uprights of the head or turn-table C; and I is the pitman or connecting-rod, by which the power of the wind-wheel is transmitted from the crank-shaft. This pitman extends down through the vertical axis, passing through one or more guide-plates, S, arranged in the tubular portion D.

J is the vane or rudder, hinged to one end of the head or turn-table, so as to swing freely. In this example of my invention the vane or rudder is provided with two parallel arms, K, arranged a sufficient distance apart to receive the end of the head between them, and to which they are pivoted by a vertical shaft, L. M is a pulley secured to the upper arm, and N is an enlarged bearing formed upon or attached to the end of the lower arm.

The vane or rudder is held in line, or nearly so, with the axis of the wind-wheel, when the latter is directly in the wind, by a stop, O, attached to the side of the head, as shown in Fig. 5, and is held parallel, or approximately parallel, to the plane of the wind-wheel, when the edge of the latter is in the wind, by stops V V, attached to the head and lower arm, K, respectively, as shown in Fig. 6.

Q Q are the operating cords or chains, secured to opposite sides of the pulley M, and extending down through the tubular axis after passing over small guide-pulleys R, mounted upon the head of the axis, as shown. These cords also pass through the guide-plates S, which hold them out of contact with each other and the pitman. By assembling the cords and pitman within the tubular axis they are brought within convenient reach of the operator for adjusting the speed and power of the mill, and their arrangement through the guide-plates prevents them from being twisted or cramped while turning with the vertical axis.

The ends of the cords within the tower are weighted, to preserve their tension during the movements of the vane or rudder, and prevent them from being tangled or misplaced.

The office of the vane or rudder is to keep the wind-wheel in proper position to receive the wind upon its arms or sails; to enable it to turn more or less out of the wind as the force of the latter varies, in order to maintain its speed at a uniform rate; and also to turn entirely out of the wind, in order to stop its rotation when the force of the wind is too great.

When the mill is set for operation the vane occupies a position at right angles, or nearly so, to the plane of the wind-wheel, and is held against the stop O by attaching a weight, X, to one of the operating-cords.

In order that the wheel shall swing laterally and overcome the gravity of the weight, some means should be employed to initiate its movement out of the wind—that is to say, to turn it slightly, so that the wind shall strike it obliquely. When mechanical devices are resorted to for this purpose, I make use of the principle of applying the direct force of the wind itself; and to this end I employ an independent wind lever, vane, or deflector, not forming any part of the steering-vane, but presenting a surface of resistance to the wind, and so proportioned to the weight that holds the wheel to its work that when the wind becomes too strong the force thereof, acting on said surface, will raise the weight and initiate the lateral movement of the wheel out of the wind, the force of the wind obliquely on the wheel being enough to complete the movement when thus initiated.

A small side vane or wind-gage, T, secured to the mill-head or vertical axis of the wheel so as to project laterally therefrom, as shown in the drawings, constitutes an effective deflector for the purpose referred to. The wind, acting ordinarily on the side vane, is not sufficient to raise the weight, and therefore does not interfere with the operation of the wheel; and the side vane is so small as to take no part, practically, in steering the mill, this office being performed entirely by the large main vane. As the lateral deflection, from whatever cause, takes place, one or the other side of the rudder is presented more strongly to the wind, and the rudder therefore yields to its pressure, the yielding movement being controlled by the weight, which must be raised by this change in the relative position of the rudder. The degree of movement of the wind-wheel out of the wind is therefore measured by the power of the latter upon the rudder to raise the weight. If the rudder were not flexible—that is to say, hinged or pivoted to the vertical axis of the wind-wheel, so as to swing as the wheel oscillates upon said axis—but held rigidly in position parallel with the axis of the wind-wheel, it would completely check the lateral deflection of the wind-wheel, and therefore the speed of the latter could not be regulated or controlled. As more wind comes in contact with the wind-wheel than is required to furnish the requisite amount of power, it causes the wheel to turn on its vertical axis, and bring its face nearer and nearer parallel with the vane or rudder, and thus reduce the effective force of the wheel temporarily. When the wind decreases the weight automatically returns the wheel and vane to their normal or working positions. When the parts are in position to receive the greatest effect from the wind, the face of the wheel is set at a right angle to the sides of the rudder or vane, or nearly so, as above described, and as the wheel is turned from such position the effect of the wind upon it is regularly diminished—or, in other words, a less amount of force is exerted upon such wheel—and this ratio of diminution is continued until the face of the wheel and the sides of the vane are brought nearly or quite parallel with each other, the edge of the wheel being turned to the wind, at which time the effect of the wind upon the wheel, so far as the production of rotary motion thereof is concerned, will have ceased. This feature of the invention is of great importance, as it renders the mill self-regulating, and thus prevents the possibility of its being injured by the too rapid motion of its parts.

The wind-wheel may also be brought to a state of rest with its edge to the wind by changing the weight X to the opposite cord, when the vane or rudder will be thrown around parallel, or nearly so, with the wheel, and retained in such position until the weight is again shifted to the outer cord or the force removed.

We are aware that wind-wheels have heretofore been provided with two diverging tail-vanes, one of which is weighted and pivoted to the turn-table. We are also aware that a single hinged tail-vane has been used, and adapted to be firmly set an angle to the axis of the wind-wheel; but these we do not claim as any part of the invention, since in none of them do the rudder and wind-wheel automatically approach and recede from each other.

We are further aware that a revolving wheel frame or support has been mounted on a revolving turn-table, which, in turn, is mounted on the top or cap of the tower, so that the turn-table, to which the rudder is rigidly fixed, rotates on one bearing or joint, and the wheel-support rotates on another formed or placed on the turn-table, both being interposed between the wheel and the tower; but the interposition of such two bearings increases the friction of the parts, and especially the weight and friction upon the pivot of the rudder, rendering the latter less sensitive to the wind. It further tends to render the parts more liable to get out of order than when the wheel is supported directly on the turn-table, and the rudder is pivoted upon a separate joint not interposed between the tower and wheel, and therefore not sustaining any part of the weight of the wheel, nor obliged to resist the strain of the working machinery.

We are further aware that efforts have been made to initiate the lateral deflection of the windmill by the side draft of the working machinery, a geared shaft being employed in lieu of a pitman, in order to obtain such side draft. But in such case the initiating of the lateral deflection is neither reliable nor dependent on the force of the wind, because the amount of side draft is always in direct proportion to the resistance of the driven machinery below, and if there were but little resistance the wheel would never go out of the wind, while if the resistance were great the wheel would go out of the wind when it ought not to. The wheel is, of course, most likely to race when the work is light; but at such time it would not be deflected, whereas when the work was heavy, and of itself would resist racing, the wheel, although not racing, would go out of action. The effect would thus be frequently the reverse of what it ought to be.

We therefore do not claim as the invention of LEONARD H. WHEELER any windmill in which the initiation of the lateral deflection depends upon the side draft of the working machinery driven by the wheel; but we limit ourselves to a mill having a single tail-vane, and in which the side deflection is initiated directly by the wind itself.

Having thus described the invention, what we claim is—

1. A windmill steered by a single pivoted tail-vane or rudder, and having a wind-wheel that swings laterally and automatically out of the wind by the direct action of the wind itself, and independently of any side draft of the driven machinery.

2. A windmill having a single pivoted tail-vane or rudder standing normally substantially in line with the wind, and a deflector to initiate the lateral movement of the wheel by the direct action of the wind.

3. A windmill having a single large pivoted tail-vane or rudder for steering purposes, a small side vane for initiating the lateral deflection of the wheel out of the wind, and a weight to normally counteract the action of the side vane.

4. The arrangement of the pitman and the operating-cords of the rudder to pass down through the vertical tubular axis of the wind-wheel, and to be held therein out of contact with each other by one or more perforated plates arranged within said tubular axis, substantially as described.

5. The stops O V, in combination with the vane or rudder and the head of the vertical axis of the wind-wheel, substantially as described, and for the purposes specified.

6. A windmill having a laterally and automatically swinging wind-wheel mounted upon the turn-table, a weight to hold the wheel to the wind, and a single tail-vane standing normally substantially in line with the wind, and pivoted to the turn-table by a pivot or bearings which do not support any part of the weight of the wheel.

7. A windmill having a single flexible tail-vane or rudder, combined with the wind-wheel, whereby the wind-wheel is normally held to the wind, but is permitted to turn automatically more or less out of the wind, substantially as described.

HARRIET W. WHEELER,
*Executrix of estate of Leonard H. Wheeler, deceased.*

WILLIAM H. WHEELER.

Witnesses:
E. S. GREENE,
G. F. WHEELER.